United States Patent [19]
Doutt

[11] 3,799,203
[45] Mar. 26, 1974

[54] FLOATING DETENT FOR SPOOL VALVES
[75] Inventor: Kingsley A. Doutt, Alpena, Mich.
[73] Assignee: Kay Pneumatics Michigan Corp., Alpena, Mich.
[22] Filed: Dec. 4, 1972
[21] Appl. No.: 311,750

[52] U.S. Cl............. 137/625.65, 335/253, 251/297
[51] Int. Cl.............................................. F16k 11/02
[58] Field of Search............ 277/174; 285/7, 8, 230, 285/231, 232; 251/137, 297; 137/625.27, 625.63, 625.64, 625.65; 335/222, 253; 287/DIG. 7

[56] References Cited
UNITED STATES PATENTS
2,071,736  2/1937  Farmer .............................. 277/174
2,663,583  12/1953 Bissell et al. ....................... 277/174
2,732,860  1/1956  Ray .................................. 137/625.64
2,967,545  1/1961  Schmidt ........................... 137/625.63
3,384,122  5/1968  Harpman ......................... 137/625.64
3,584,889  6/1971  Sheets ................................ 285/231

Primary Examiner—Henry T. Klinksiek
Attorney, Agent, or Firm—Webster B. Harpman

[57] ABSTRACT

A solenoid operated valve having a free floating sliding spool is provided with an improved detent device loosely caged in the body of the valve and slidably engaging the sliding spool to frictionally restrain longitudinal movement thereof.

5 Claims, 3 Drawing Figures

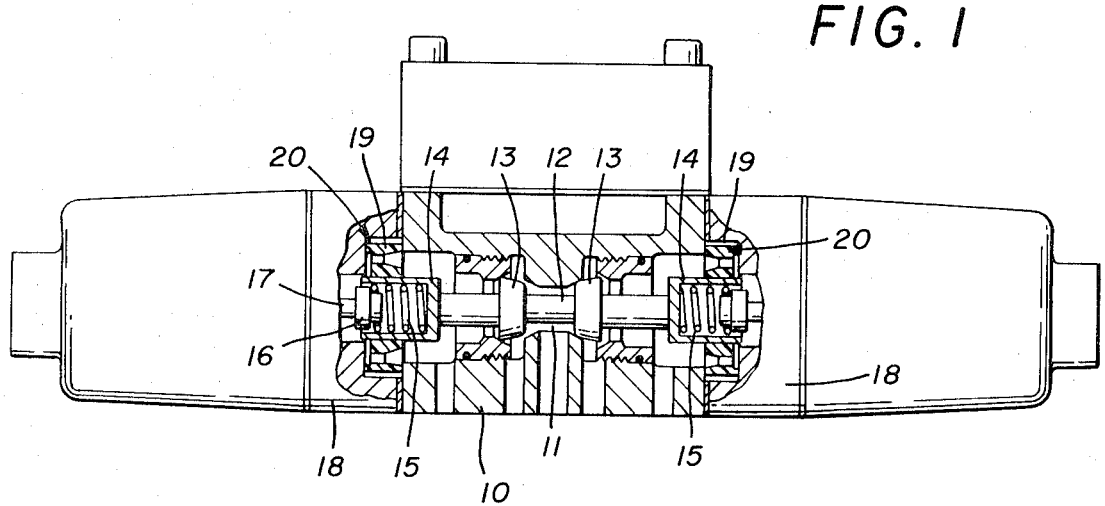
FIG. 1
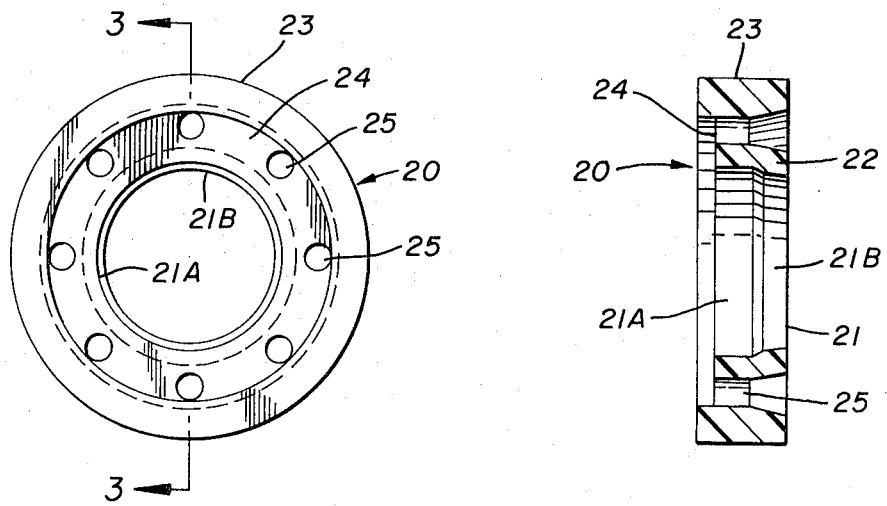
FIG. 2
FIG. 3

FLOATING DETENT FOR SPOOL VALVES

BACKGROUND OF THE INVENTION

1. Field of the Invention

This invention relates to solenoid operated directional valves of the sliding spool type having means engaging the sliding spool to resist movement of the spool due to vibration or shake.

2. Description of the Priot Art

Prior structures of this type have employed friction pads and tensioning means urging the same against the spool (see for example U.S. Pat. No. 3,608,586) and other prior art structures have incorporated holding rings firmly positioned in the valve body and frictionally engaging the sliding spool while forming a liquid seal as seen in U.S. Pat. No. 2,967,545.

This invention eliminates the problems in the prior art devices and their interference with the desired operation of the sliding spool of a solenoid actuated directional valve.

SUMMARY OF THE INVENTION

A solenoid operated valve having a free floating sliding spool incorporates annular detents in interference fit on the solenoids spring housing on each end of the sliding spool with the detents floating in counter bores in the solenoid caps of the valve so as to be retained against axial movement with the sliding spool. The detents are apertured to provide balanced fluid pressure on both sides to prevent the solenoid spring housings from becoming pistons that could cause movement of the sliding spool and valve malfunction.

DESCRIPTION OF THE DRAWINGS

FIG. 1 is a side elevation with parts broken away and parts in cross section illustrating a solenoid actuated valve incorporating a preferred from of the present invention.

FIG. 2 is an enlarged plan view of one of the detent devices seen in FIG. 1 and

FIG. 3 is a vertical section on line 3—3 of FIG. 2.

DESCRIPTION OF THE PREFERRED EMBODIMENT

In its simplest form the floating detent for spool valves disclosed herein is illustrated as applied to a double solenoid to position spool valves as modified for use with the improvement and as illustrated in FIG. 1 the valve incorporates a body 10 having a cylindrical bore 11 intersected by axially spaced, laterally extending fluid ports and a freely floating spool 12 movable in the cylindrical bore 11. Enlarged valve members 13 are secured to the spool 12 for engagement between opposed pairs of valve seats formed in the cylindrical bore and as set forth in U.S. Pat. No. 3,384,122.

Spring housings 14 are attached to the opposite ends of the spool 12 and enclose springs 15 which are positioned between the inner ends of the spring housings 14 and ends 16 of armatures 17 and a pair of solenoids which are provided as will be understood by those skilled in the art for imparting axial motion to the spool 12.

The solenoids are positioned outwardly of solenoid caps 18 which are affixed to the opposite ends of the valve body 10. Counter bores 19 in the inner portions of the solenoid caps 18 and of diameters larger than the adjacent portions of the cylindrical bore 11 loosely cage annular detents 20. Each of the annular detents 20 has an inner diameter 21 forming an interference fit over the spring housings 14.

By referring to FIGS. 2 and 3 of the drawings wherein enlarged plan and cross sectional views of the annular detent 20 may be seen, it will be observed that the inner configuration of the annular detent 20 includes a first section 21A which is of uniform diameter axially and a second section 21B which is tapered axially and terminating in a diameter smaller than the diameter of the first section 21A. In effect, this configuration forms an annular flange 22 having the configuration of a truncated cone shaped cylinder. The detents 20 are formed of flexible resilient synthetic resin having sufficient rigidity to be self-retaining in the counter bores 19 of the solenoid caps 18 while at the same time resiliently and flexibly frictionally engaging the exterior cylindrical surfaces of the solenoid spring housings 14. Each of the detents 20 has a relatively wide annular rim 23 and a relatively narrow inter-connecting body 24 which is apertured circumferentially as at 25.

It will be observed by referring again to FIG. 1 of the drawings that when the detents 20 are installed on the solenoid spring housings 14 the tapered annular flange 22 of each assumes a position in line with the portion 21A thereof so that different degrees of frictional resistence are imparted to the spring housings 14 thereof.

It will thus be seen that the interference fit between the solenoid spring housings 14 and the floating detent 20 thereon provides a resistance to axial movement of the spool 12 that will require a two to three pound force to overcome and relocate the spool. In a typical air valve as illustrated herein the spool weight is approximately three ounces including the armature of one of the solenoids. The load condition established by the floating detents 20 are ideal for the resistance of movement of the spool due to vibration or shake. The apertures 25 in the detents 20 permit pressure within the valve body to be present on both sides of the detents 20 and thus insure its full floating operation and completely eliminate the possibility of the solenoid spring housings 14 and the detents from becoming pistons that could cause valve spool movement and valve malfunction.

In operation whenever either one of the solenoids attached to the solenoid caps 18 is energized, the corresponding armature 17 pushes the spool 12 through the spring 15 and the spring housing 14 to the right or to the left respectively. The spring housings 14 slide through the detents 20 overcoming the frictional force thereof. When the solenoid is de-energized the detents 20 prevent the spool 12 from drifting.

Those skilled in the art will observe that the spool 12 and the valve elements 13 thereon as well as the solenoid spring housings 14 are free floating in the cylindrical bore 11 and the detents 20 on the spring housings 14 are full floating in the counter bores 19 of the solenoid caps 18. Thus the improved floating detents as disclosed herein contribute to the efficiency of the solenoid valve by permitting the valve elements 13 to seat properly as a result of the full floating action of the spool 12 and its associated parts.

Although but one embodiment of the present invention has been illustrated and described, it will be apparent to those skilled in the art that various changes and modifications may be made therein without departing from the spirit of the invention.

I claim:

1. In a solenoid operated fluid control valve having a body provided with a cylindrical bore intersected by axially spaced, laterally extending fluid ports, a freely floating spool slidable in the bore and oppositely acting solenoids each having an operating plunger arranged to actuate the spool in one direction or the other; the improvement comprising full floating detents frictionally engaging said spool and positioned in enlarged areas in said valve adjacent said cylindrical bore so as to be movable radially with said spool relative to said valve and fixed with respect to axial movement of said spool in said valve.

2. The improvement in a solenoid operated fluid control valve set forth in claim 1 and wherein the detents are apertured to permit fluid in the valve body to be present on both sides of said detents.

3. The improvement in a solenoid operated fluid control valve set forth in claim 1 and wherein said spool has spring housings on its opposite ends and said detents are engaged on said spring housings.

4. The improvement in a solenoid operated fluid control valve set forth in claim 1 and wherein said detents are resilient synthetic resin.

5. The improvement in a solenoid operated fluid control valve set forth in claim 1 and wherein said detents are resilient and have tapered annular flanges defining their innermost diameters.

* * * * *